(12) United States Patent
Toyoda et al.

(10) Patent No.: US 7,504,488 B2
(45) Date of Patent: Mar. 17, 2009

(54) DYE, DYE PRODUCTION METHOD AND INK CONTAINING DYE

(75) Inventors: Takayuki Toyoda, Yokohama (JP); Yasuaki Murai, Kawasaki (JP); Waka Hasegawa, Kawasaki (JP); Masashi Hirose, Machida (JP); Kuniaki Fujimoto, Chofu (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 11/748,745

(22) Filed: May 15, 2007

(65) Prior Publication Data

US 2007/0277701 A1   Dec. 6, 2007

(30) Foreign Application Priority Data

May 19, 2006   (JP) .............................. 2006-140423

(51) Int. Cl.
*C09B 29/03*   (2006.01)
*C09B 29/42*   (2006.01)
*C09D 11/00*   (2006.01)
*C09D 11/02*   (2006.01)

(52) U.S. Cl. .................................. 534/772; 106/31.48

(58) Field of Classification Search ........................ None
See application file for complete search history.

(56) References Cited

U.S. PATENT DOCUMENTS

| | | | | |
|---|---|---|---|---|
| 4,368,260 | A * | 1/1983 | Komamura et al. | 430/562 |
| 4,514,226 | A * | 4/1985 | Leoffler | 106/31.48 |
| 5,570,120 | A | 10/1996 | Sakaki et al. | 347/105 |
| 6,084,006 | A | 7/2000 | Kashiwazaki et al. | 523/160 |
| 6,162,510 | A | 12/2000 | Kashiwazaki et al. | 427/511 |
| 6,174,056 | B1 | 1/2001 | Sakaki et al. | 347/100 |
| 6,203,604 | B1 | 3/2001 | Kashiwazaki et al. | 106/31.5 |
| 6,248,482 | B1 | 6/2001 | Kashiwazaki et al. | 430/7 |
| 6,521,323 | B1 | 2/2003 | Sakaki et al. | 428/195 |
| 6,533,852 | B2 | 3/2003 | Hirose | 106/31.48 |
| 6,723,835 | B1 | 4/2004 | Millard et al. | 534/772 |
| 6,921,433 | B2 | 7/2005 | Kuribayashi et al. | 106/499 |
| 6,964,700 | B2 | 11/2005 | Uji et al. | 106/31.28 |
| 7,083,667 | B2 | 8/2006 | Murai et al. | 106/31.43 |
| 7,285,159 | B2 | 10/2007 | Aikawa et al. | 106/31.47 |
| 2005/0188894 | A1 | 9/2005 | Yamagishi et al. | 106/31.43 |
| 2006/0109324 | A1 | | 5/2006 | Fujimoto et al. | 347/100 |
| 2006/0125896 | A1 | | 6/2006 | Aikawa et al. | 347/100 |
| 2006/0183046 | A1 | | 8/2006 | Murai et al. | 430/108.2 |
| 2008/0220358 | A1* | | 9/2008 | Tanaka et al. | 430/108.23 |

FOREIGN PATENT DOCUMENTS

| | | |
|---|---|---|
| GB | 1 373 314 | 11/1974 |
| JP | 48-044263 | 6/1973 |
| JP | 2001-288393 | 10/2001 |
| JP | 2002-363455 | 12/2002 |
| JP | 2003-510398 | 3/2003 |
| WO | WO 01/21714 A2 | 3/2001 |

OTHER PUBLICATIONS

Ritter et al., "A New Reaction of Nitriles," J. Am. Chem, vol. 70, pp. 4045-4048 (1948).

* cited by examiner

*Primary Examiner*—Fiona T Powers
(74) *Attorney, Agent, or Firm*—Fitzpatrick, Cella, Harper & Scinto

(57) ABSTRACT

The present invention is a dye represented by the following general formula (1), a method of producing the dye and an ink containing the dye, General formula (1)

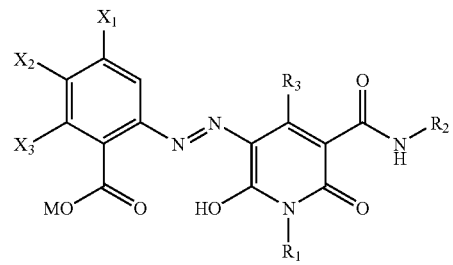

wherein $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion.

10 Claims, 5 Drawing Sheets

DYE, DYE PRODUCTION METHOD AND INK CONTAINING DYE

BACKGROUND OF THE INVENTION

1. Field of the Invention

The present invention relates to a dye having a novel structure, a method of producing the dye and an ink containing the dye.

2. Description of the Related Art

As a result of the dramatic development in recording technology in recent years, high quality color recording and image output can now be performed very simply. Specifically, it is becoming more common to use personal computers and input/output apparatuses, such as digital cameras, scanners, inkjet printers, color laser printers and the like. Recording apparatuses that employ an inkjet recording method have quickly become popular, since their raw material cost is low, rapid recording can be achieved, it is less noisy during recording, and color recording can be easily provided. This has resulted in calls for even further development of such apparatuses. Specifically, there is a need for a recording apparatus which can more easily output images and documents having greater detail with images having excellent color reproduction and which can retain this state for a long period of time.

While water-soluble dyes are usually used as coloring materials constituting the inks used for inkjet recording in this case, a recorded image formed from an ink which contains a water-soluble dye normally suffers from the problem of having poor image durability. On the other hand, although inks which use a pigment for the coloring material form recorded images that have excellent durability, light tends to scatter as a result of the pigment particles. Thus, compared with inks using a dye, inks using a pigment have suffered from the separate problem that color reproducibility of the image and transparency of the image have been poor.

To resolve these problems, investigations have been made to enable image formation with satisfactory storage stability while also maintaining the color reproducibility and transparency of the image, by using a water-soluble dye in the ink which has high weatherability against light and oxidizing gases (e.g., $NO_x$, $SO_x$, ozone etc.) in the air. To solve these problems by using yellow dyes especially and to enable image formation with satisfactory storage stability while also maintaining the color reproducibility and transparency of the image, it has been proposed to use a pyridone azo dye as a high color development water-soluble yellow dye (refer to Japanese Patent Application Laid-Open No. 2001-288393).

A dye having a carboxyl group in the ortho position of a diazo component has also been proposed as a dye having excellent weatherfastness (refer to Japanese Patent Application Laid-Open No. 2003-510398). However, when an image is formed using the dye described in this publication as the ink component, the obtained image has the problem that it does not have sufficient weatherfastness, especially ozone resistance. Further, the humidity resistance of the image is also insufficient.

To faithfully reproduce an RGB image, an inkjet printing method has recently been proposed which uses a specifically colored ink, such as red, green or blue ink, which has excellent color developability (refer to Japanese Patent Application Laid-Open No. 2002-363455). Particularly in the green region, to form natural images, such as of greenery or landscapes, or to form an image of a product lit up using artificial light, the color reproduction range must not only be broad, but it is also important to have excellent vividness, sense of transparency and contrast. There is thus a need for a green ink having superior color tone as well as high weatherfastness and humidity resistance.

On the other hand, the following methods have been proposed for producing a 6-hydroxy-2-pyridone-3-carboxylic acid amide compound, which is an important intermediate for a high color development water-soluble yellow dye: condensation of a β-ketoester and malonic acid diamide; or condensation of a β-ketoamide and malonic acid monoamide-monoester (refer to Japanese Patent Application Laid-Open No. S48-044263).

However, these conventional production methods suffer from problems with availability of their raw materials, restrictions on their application scope, and that in many cases their yield is low. Concerning these points, the reaction in which a cyano group is reacted with an alcohol or an alkene in an acid catalyst is known as a "Ritter Reaction" (refer to J. J. Ritter and P. P. Minieri, J. Am. Chem. Soc., 70, 4045 (1948)). However, no examples in which the Ritter reaction was applied to a pyridone compound have, until now, been reported.

SUMMARY OF THE INVENTION

It is an object of the present invention to provide a dye that has excellent spectral reflectivity characteristics such as color developability, transparency and the like and that exhibits excellent light resistance, ozone resistance and humidity resistance especially when used in image formation. It is also an object of the present invention to provide an industrially advantageous method of producing this dye. It is another object of the present invention to provide an aqueous ink which can provide an image having good color tone, yet which also has excellent storage stability, when used as an ink used for inkjet recording. It is still another object of the present invention to provide a green ink having good characteristics through the use of this dye together with a copper phthalocyanine compound.

These objects are achieved by the following present invention. Specifically, the present invention is a dye represented by the following general formula (1), General formula (1)

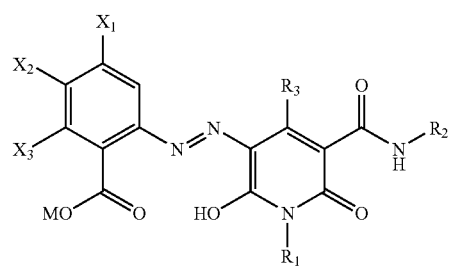

(wherein $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion).

Further, another aspect of the present invention is a method of producing an azo dye including: reacting a nitrile compound represented by the following general formula (3) in the presence of an acid catalyst with an alcohol or an alkene; and then coupling the obtained reaction product with a diazo component of an aniline derivative represented by the following general formula (4). This method is especially preferable as a method of producing the dye according to the present invention,

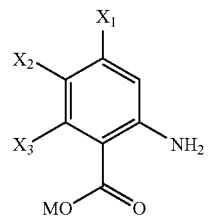

General formula (4)

(wherein, $X_1$ through $X_3$ and M are defined in the same manner as for the above general formula (1)).

Further, the present invention also provides an aqueous ink, and especially preferably, an ink used for inkjet recording, which at least includes an aqueous medium and the dye represented by general formula (1).

The present invention also provides a green ink further including, in addition to the dye represented by general formula (1), a copper phthalocyanine compound, and especially the copper phthalocyanine compound represented by general formula (5) or (6),

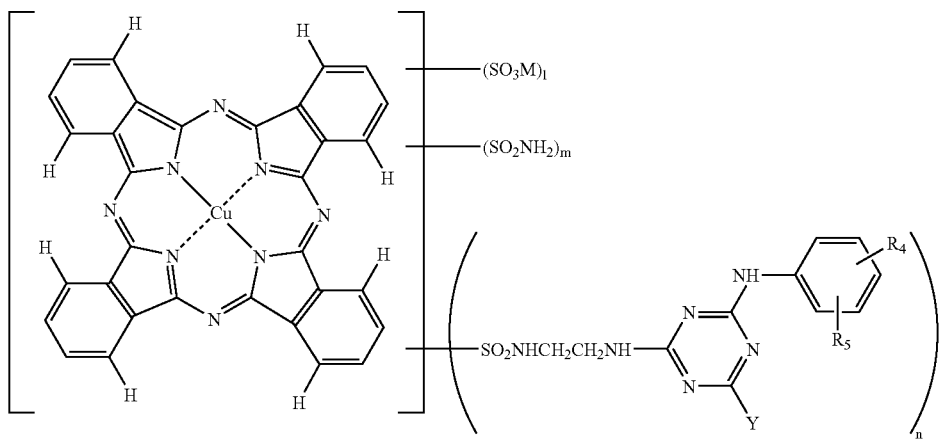

General formula (5)

(wherein, $R_4$ and $R_5$ independently represent any of a hydrogen atom, —$SO_3M$ and —COOM (however, $R_4$ and $R_5$ cannot both simultaneously be a hydrogen atom); Y represents a chlorine atom, a hydroxyl group, an amino group, or a mono- or dialkylamino group; the substituted position of the substituent in the phthalocyanine ring is the β position; M represents a counter ion; and l denotes 0 to 2, m denotes 1 to 3, n denotes 1 to 3, and l+m+n=3 or 4).

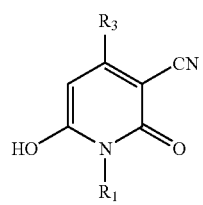

General formula (3)

(wherein, $R_1$ and $R_3$ are defined in the same manner as for the above general formula (1))

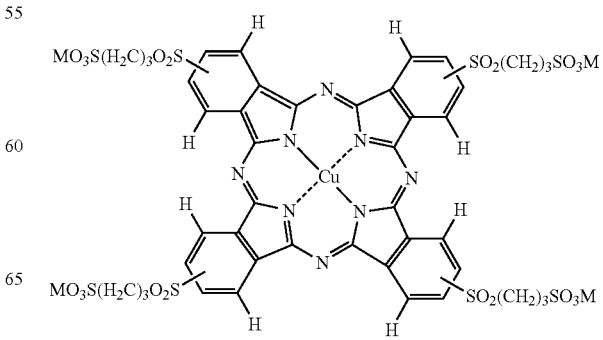

General formula (6)

(wherein, the substituted position of the substituent in the phthalocyanine ring is the β position; and M represents a counter ion.)

The present invention provides a dye, and an industrially advantageous method of producing the dye, which has excellent spectral reflectivity characteristics such as color developability, transparency and the like, and when used in image formation, is effective in providing an image that exhibits high weatherfastness and humidity resistance. By using this dye for the coloring material used in an ink, an aqueous ink can be provided which has good color tone. Such an aqueous ink can be, for example, effectively used as an ink used in inject recording. Further, by using a copper phthalocyanine compound as an additional dye in the excellent dye provided by the present invention, a more effective green ink, and especially a green ink used in inject recording, can be provided.

Further features of the present invention will become apparent from the following description of exemplary embodiments with reference to the attached drawings.

DESCRIPTION OF THE EMBODIMENTS

Figure 1:
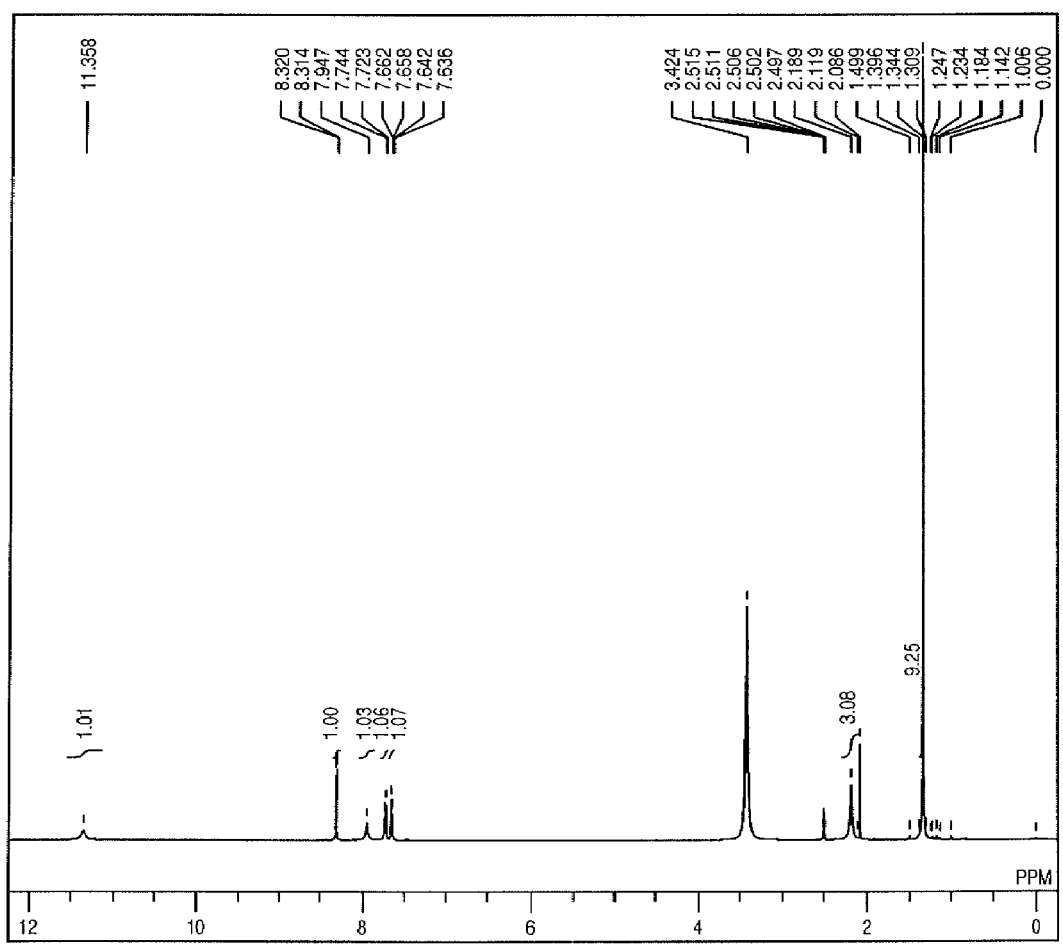
FIG. 1 is a diagram representing the $^1$H NMR spectrum of a compound (9) of the present invention in DMSO-$d_6$ at room temperature and 400 MHz.
Figure 2:
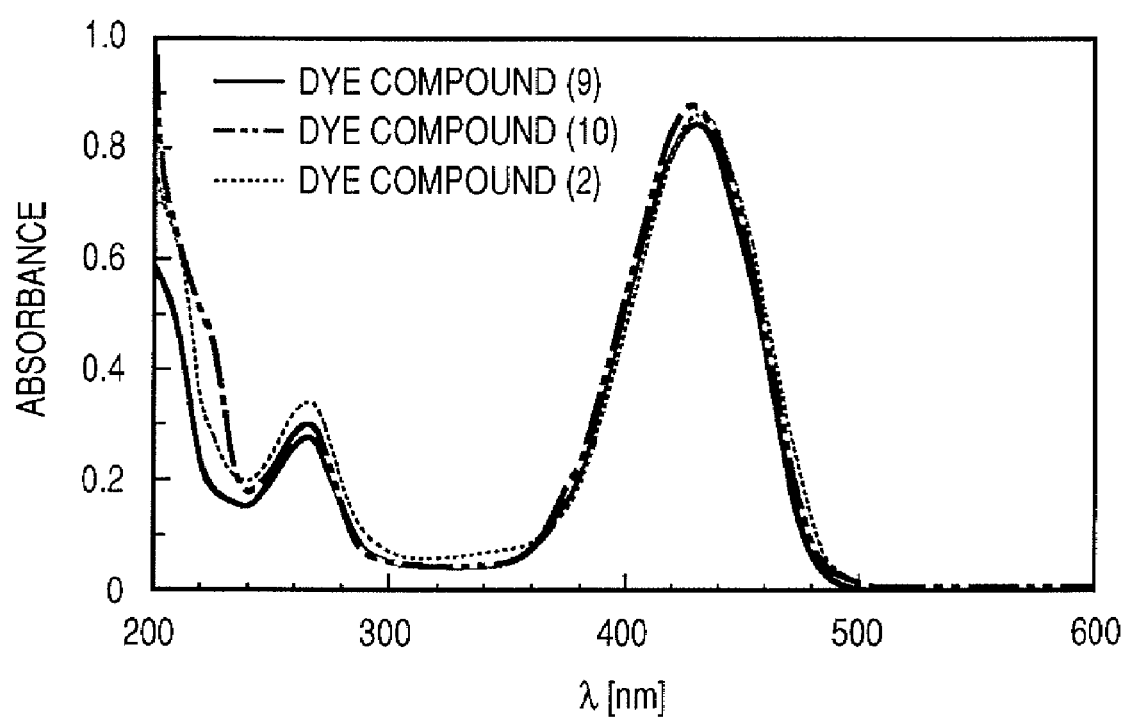
FIG. 2 is a diagram representing the ultraviolet-visible light absorbance spectrum of the compound (9) (solid line), a compound (10) of the present invention (white-spaced line) and a comparative compound (2) (dashed line) in water at room temperature (concentration: $2.0 \times 10^{-5}$ M).

The present invention will now be described in more detail with reference to the following exemplary embodiments. As a result of extensive investigation into solving the above-described problems in the conventional art, the present inventors discovered that a dye represented by the following general formula (1) has excellent spectral reflectivity characteristics such as color developability, transparency and the like, yet also exhibits high weatherfastness against light and oxidizing gases in the air, thereby arriving at the present invention. Especially when the dye represented by general formula (1) is used to form an aqueous ink, an ink suitable for inkjet recording can be provided which has good color tone. The dye represented by general formula (1) and an industrially advantageous method of producing this dye will now be described.

(Dye)

The dye according to the present invention is represented by the following general formula (1),

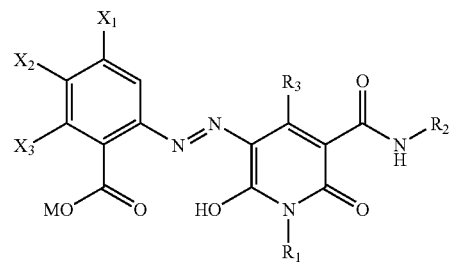

General formula (1)

(wherein, $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion).

A detailed explanation will now be made of the dye represented by the above-described general formula (1), a preferable dye thereof represented by general formula (2), and the compounds represented by the above-described general formulae (3) and (4) which are used as raw materials during production of these dyes. The alkyl groups in $R_1$ and $R_3$ in these formulae are not especially limited, but can be used preferably alkyl groups having 1 to 9 carbon atoms. This is because if the alkyl group has 10 or more carbon atoms, it is more difficult for the dye represented by general formula (1) to dissolve in water. If $R_1$ and $R_3$ in the formulae are an alkyl group, more preferred examples include a methyl group, an ethyl group, an n-propyl group, an isopropyl group, an n-butyl group, a sec-butyl group, a tert-butyl group and a 2-ethylhexyl group.

$R_1$ and $R_3$ in general formulae (1) and (3) may be an aryl group. In such a case, examples may include, but are not especially limited to, a phenyl group, a naphthyl group and the like. $R_1$ and $R_3$ in general formulae (1) and (3) may be an aralkyl group. In such a case, examples may include, but are not especially limited to, a benzyl group and a phenethyl group and the like.

Although $R_1$ and $R_3$ in general formulae (1) and (3) independently represent an alkyl group, an aryl group and an aralkyl group such as described above, such groups may be further substituted with a substituent. Groups which may be substituted in this case are not especially limited as long as the group is inactive in a Ritter reaction. Examples include the following substituents: a halogen atom, a nitro group, a carbamoyl group, an amide group, a sulfamoyl group, a sulfonamide group, an alkoxy group, an ionic group and the like. From the points of raw material availability and solubility in water, especially preferred examples of $R_1$ and $R_3$ in general formulae (1) and (3) are a hydrogen atom for $R_1$ and a methyl group for $R_3$.

$R_2$ in the above-described general formulae (1) and (2) will now be described. If $R_2$ in general formulae (1) and (2) is an alkyl group, such an alkyl group is not especially limited, but is preferably an alkyl group having 1 to 8 carbon atoms. This is because if the alkyl group has 9 or more carbon atoms, it is more difficult for the dye represented by general formula (1) or (2) to dissolve in water. If $R_2$ in the formulae is an alkyl group, the following examples are more preferred: an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group and a 2-ethylhexyl group.

If $R_2$ in general formulae (1) and (2) is an alkyl group, such an alkyl group may be further substituted with a substituent. Although groups which may be substituted are not especially limited as long as the group is inactive in a Ritter reaction, examples include the following substituents: a halogen atom, a nitro group, a carbamoyl group, an amide group, a sulfamoyl group, a sulfonamide group, an alkoxy group, a heterocyclic group which may be substituted, an ionic group and the like. Examples of the heterocyclic group which may be substituted include a tetrahydrofuryl group, a furyl group, a pyridyl group, an imidazolyl group, a methylthiazolyl group, and the like.

If $R_2$ in general formulae (1) and (2) is a cycloalkyl group, examples of the cycloalkyl group include, but are not especially limited to, a cyclopentyl group, a cyclohexyl group, a cycloheptyl group and the like. Further, some or all of the carbon atoms in the cycloalkyl group may be substituted with a heteroatom. Specific examples include a tetrahydrofuryl group, a tetrahydropyranyl group, a pyrrolidinyl group, a piperazinyl group, a morpholinyl group and the like. Among these examples, a cycloalkyl group having 5 to 12 carbon atoms is preferable. This is because if a cycloalkyl group having 13 or more carbon atoms is used for the $R_2$ in general formula (2), it is more difficult for the dye to dissolve in water.

If $R_2$ in general formulae (1) and (2) is an aralkyl group, examples of the aralkyl group include, but are not especially limited to, a benzyl group, a phenethyl group, a phenylpropyl group and the like. From the point of solubility in water, it is especially preferable if the dye according to general formulae (1) and (2) has an $R_2$ which is a phenethyl group or a phenylpropyl group that is substituted with at least one ionic group.

If $R_2$ in general formulae (1) and (2) is a cycloalkyl group or an aralkyl group such as described above, such groups may be further substituted with a substituent. Groups which may be substituted are not especially limited as long as the group is inactive in a Ritter reaction. Examples include a halogen atom, a nitro group, a carbamoyl group, an amide group, a sulfamoyl group, a sulfonamide group, an alkoxy group, an ionic group and the like.

$X_1$ through $X_3$ in general formulae (1) (2) and (4) will now be described. $X_1$ through $X_3$ in general formulae (2) and (4) represent a hydrogen atom or any substituent. Here, the term "arbitrary substituent" includes, but is not especially limited to, the following examples: an alkyl group, an alkoxy group, a halogen atom, a carbamoyl group, an amide group, a sulfamoyl group, a sulfonamide group, a hydroxy group, a cyano group, a nitro group, an alkyl ester group, an ionic group and the like. Among these examples, it is more preferred for at least one of $X_1$ through $X_3$ to be an ionic group. This is because by making at least one of $X_1$ through $X_3$ an ionic group, the dye represented by general formulae (1) or (2) exhibits excellent color tone.

Here, the term "ionic group" includes both cationic groups and anionic groups. Examples of the cationic groups include primary, secondary, tertiary and quaternary amino groups, an imino group, a pyridinyl group and the like. Examples of the anionic groups include a carboxyl group, a sulfone group, a phosphate group and the like.

The M in each general formula, including general formulae (5) and (6), represents a counter ion. Preferable examples of the counter ion include the following: a hydrogen atom; ions of alkali metals, such as lithium, sodium, potassium and the like; ammonium, methylammonium, dimethylammonium, trimethylammonium, tetramethylammonium; ethylammonium, diethylammonium, triethylammonium, tetraethylammonium; and ammonium or organic ammonium, such as n-propylammonium, isopropylammonium, diisopropylammonium; n-butylammonium, tetra-n-butylammonium, isobutylammonium; monoethanol ammonium, diethanol ammonium, triethanol ammonium and the like. Especially preferable among these examples are a hydrogen atom, a lithium ion, a sodium ion, a potassium ion and ammonium.

It is noted that M in the formula is described as "represents a counter ion", as it can be considered that if, for example, the dye according to the present invention is used to form an aqueous ink used for inkjet recording, M dissociates to form a counter ion. However, this is not meant to exclude substances which do not dissociate in the ink. The same applies for the expression "represents a counter ion" concerning the other dyes as well.

(Dye Production Method)

The method of producing the novel dye according to the present invention will now be described. The method of producing the dye according to the present invention has the following two steps. Specifically: (1) a step in which a nitrile compound represented by the following general formula (3) is reacted with an alcohol or an alkene in the presence of an acid catalyst (hereinafter, "step 1"), followed by a coupling step in which the reaction product obtained in step 1 is coupled with a diazo component of an aniline derivative represented by the following general formula (4) (hereinafter, "step 2"). In the compound represented by general formula (3), tautomers of the hydroxypyridine compound are present.

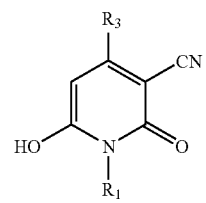

General formula (3)

(wherein, $R_1$ represents a hydrogen atom, an alkyl group that may be substituted, an aryl group that may be substituted or an aralkyl group that may be substituted; and $R_3$ represents an alkyl group that may be substituted, an aryl group that may be substituted or an aralkyl group that may be substituted)

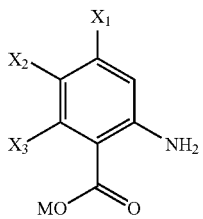

General formula (4)

(wherein, $X_1$ through $X_3$ independently represent a hydrogen atom or any substituent)

The materials used in the above-described steps and each of the operations carried out in the steps will now be described. First, the nitrile compound represented by general formula (3) and the aniline derivative represented by general formula (4) which are used as raw materials will be described.

(1) Step 1

In step 1 of the production method according to the present invention, the nitrile compound represented by general formula (3) is reacted with an alcohol or an alkene in the presence of an acid catalyst. Examples of the acid catalyst which can be used at this stage include concentrated sulfuric acid, perchloric acid, phosphoric acid, polyphosphoric acid, formic acid, boron trifluoride and the like. An especially preferable acid catalyst is concentrated sulfuric acid, and commercially-available 85% or 98% concentrated sulfuric acid may be preferably used. While the concentration of the acid catalyst is not especially limited, it is preferably about 1.0 mole to 30.0 mole based on 1.0 mole of the nitrile compound represented by general formula (3).

Although a reaction solvent may or may not be used in step 1 of the production method according to the present invention, it is preferable to use an appropriate amount of a following reaction solvent: glacial acetic acid, acetic anhydride, di-n-butyl ether, chloroform, carbon tetrachloride, hexane, nitrobenzene and the like. A preferred reaction solvent among these examples is glacial acetic acid. Especially when the preferable concentrated sulfuric acid is used as the acid catalyst, by using glacial acetic acid as the reaction solvent the reaction yield can be improved. However, if a primary or secondary alcohol is used as the alcohol to react with the nitrile compound represented by general formula (3), it is not preferable to use glacial acetic acid, as the yield decreases due to an ester being formed.

The reaction carried out in step 1 of the production method of the present invention is not especially limited and may be carried out in accordance with either of the following methods: a method in which an alcohol or an alkene and the nitrile compound represented by general formula (3) are dropped in an acid catalyst such as concentrated sulfuric acid; or a method in which an alcohol or an alkene is premixed with the nitrile compound represented by general formula (3), and an acid catalyst is dropped in the resulting mixture.

Although the amount of the alcohol or alkene made to react with the nitrile compound represented by general formula (3) is not especially limited, in the present invention this amount is preferably set within the following range. Based on 1.0 mole of the nitrile compound represented by general formula (3), the amount of the alcohol or alkene is preferably 1.0 mole to 5.0 moles, and more preferably, 1.0 mole to 2.5 moles. Specifically, if the used amount of the alcohol or alkene exceeds the above-described range, not only is it economically disadvantageous, but purification becomes more difficult, and thus is not preferable. Further, the temperature when dropping into the acid catalyst is preferably in the range of 0 to 10° C. After dropping, it is preferable to make the reaction proceed for 1 to 3 hours at room temperature to 60° C. At a temperature higher than 60° C., the hydrolysate of the nitrile is formed as the reaction proceeds, whereby the yield tends to decrease.

Examples of the alcohol used in step 1 include secondary alcohols, tertiary alcohols, alicyclic alcohols, heterocyclic alcohols and aralkyl alcohols. Preferable among these are secondary alcohols, tertiary alcohols and aralkyl alcohols. More specifically, benzyl alcohol, tert-butyl alcohol, 2-methyl-2-methanol, 3-methyl-3-pentanol and the like.

Examples of the alkene used in step 1 include the following: linear alkenes, such as hexene, heptene, octene and the like; substituted or unsubstituted branched alkenes, such as 2-methyl-2-butene, 2-methyl-2-pentene, 3,3-dimethylacrylic acid, 2-methyl-2-propene-1-sulfonic acid and the like; substituted or unsubstituted cyclic alkenes, such as cyclopentene, cyclohexene, cycloheptene, cyclooctene, 3-cyclopentene-1-carboxylic acid and the like; substituted or unsubstituted aromatic vinyl compounds, such as styrene, p-styrene sulfonic acid, p-vinylbenzoic acid and the like; and substituted or unsubstituted heterocyclic vinyl compounds, such as 2-vinylpyridine, 4-methyl-5-vinylthiazole and the like.

(2) Step 2

In step 2 of the production method according to the present invention, the reaction product obtained in step 1 and the diazo component of the aniline derivative represented by general formula (4) are coupled together, to thereby produce the dye represented by general formula (1). The "reaction product obtained in step 1" refers to a reaction product obtained by reacting the nitrile compound represented by general formula (3) in the presence of an acid catalyst with the alcohol or alkene. In the following, this reaction product shall be referred to as a "coupler". Step 2 of the production method according to the present invention may be performed by a well-known coupling method.

For instance, the coupling may be performed by such a method as described as follows. First, in hydrochloric acid, the aniline derivative represented by general formula (4) is charged with aqueous sodium nitrite, and the aniline derivative is diazotized by a typical method. After diazotization, the resultant product is charged into the coupler obtained in step 1, whereby a coupling reaction takes place. The reaction liquid is then discharged into a poor solvent, and the formed compound is filtered to thereby produce the dye represented by general formula (1). It is noted that the coupling reaction is not limited to this method. Further, the dye obtained by such a reaction may be treated in accordance with a typical organic reaction aftertreatment and then purified for use in a desired application.

The thus-obtained dye can be identified by conducting various analyses using instruments such as those described below. Specifically, in the present invention, identification was carried out using the following instruments: $^1H$ and $^{13}C$ nuclear magnetic resonance spectrometer ("ECA-400", manufactured by JEOL Ltd.), high-performance liquid chromatography system ("LC20A", manufactured by Shimadzu Corporation), LC/TOF MS (LC/MSD TOE, manufactured by Agilent Technologies), UV/Vis spectrophotometer (U-3310 model spectrophotometer, manufactured by Hitachi Ltd.).

The dye obtained in the above manner has a vivid color tone, and due to its spectral characteristics, can be used as a coloring material used in coloring. Such a dye can preferably be used as a material used in recording of image information. Specifically, this dye can be used as an ink used for recording in an inkjet system, as well as a material for printing ink, coatings, or writing ink. This dye is especially effective as a coloring material for an ink used in recording in an inkjet system.

(Ink)

Next, the method of producing the aqueous ink which contains the dye according to the present invention will be described. The ink according to the present invention can especially be preferably used as an ink used for inkjet recording. The dye according to the present invention represented by general formula (1) can produce an ink composition capable of being used as an ink by dissolving and/or dispersing the dye in a liquid medium or the like. When used as an ink used for inkjet recording that employs an aqueous medium as the liquid medium, it is especially preferable for the dye according to the present invention to be contained in the range of 0.2 parts by mass or more to 10 parts by mass or less based on 100 parts by mass of ink.

As the aqueous medium used when preparing the ink, water or a mixed medium of water and a water-soluble organic solvent can be used. The water-soluble organic solvent used at this stage is not especially limited as long as the solvent is soluble in water. Examples include alcohol, polyhydric alcohol, polyglycol, glycol ether, nitrogen-containing polar solvents, sulfur-containing polar solvents and the like. Considering moisture retention of the ink, solubility improvement of the coloring material and effective permeation of the ink into the recording paper, the content of the water-soluble organic solvent is preferably in the range of 10% by mass or more to 40% by mass or less of the ink total, and more preferably, in the range of 10% by mass or more to 30% by mass or less. Further, the water content in the ink containing the dye according to the present invention as a coloring material is preferably in the range of 30% by mass or more to 95% by mass or less. By setting in this range, dispersibility, or solubility, of the coloring material in the ink, is good, the ink has the viscosity required for stable ink ejection when used for inkjet recording, and clogging can be prevented from occurring at the tip of the nozzles.

A surfactant may also be added in order to control the permeability of the ink. In such a case, surfactants which can be used include ionic surfactants, non-ionic surfactants, and chemically synthesized surfactants, such as polymer surfactants. In addition, surfactants derived from natural substances and surfactants which have been modified by an enzyme or the like may also be used. Such surfactants may be used alone or as a combination together. The total content of the surfactant is preferably 0.5% by mass or more to 20% by mass or less of the ink total.

Further, when forming as an ink, in addition to the above-described components, various other additives can be incorporated as necessary, examples including a pH modifier, a corrosion inhibitor, a preservative, an anti-mildew agent, an antioxidant, an anti-reduction agent, an evaporation promoter, a chelating agent, a water-soluble polymer and the like.

As described above, the ink prepared using the dye according to the present invention can be preferably used in an inkjet recording system which conducts recording by ejecting liquid droplets from the action of thermal energy. The ink containing the dye according to the present invention can be applied to other inkjet recording methods, and can even be used in a general writing instrument.

Another embodiment of the ink according to the present invention is an ink which further contains a copper phthalocyanine compound by adding such a copper phthalocyanine compound to the dye according to the present invention (hereinafter sometimes referred to as "water-soluble pyridone azo dye"). Especially preferable are recording inks prepared for use as a green color tone that contain the water-soluble pyridone azo dye and the copper phthalocyanine compound in a mass ratio in the range of 10:1 to 1:10.

While any compound, including those already known, may be used as the copper phthalocyanine compound, especially preferable are those compounds represented by the following general formula (5) or (6) This is because these compounds have especially excellent weatherability and color developability, and have a large effect when mixed with the water-soluble pyridone azo dye according to the present invention. Regarding the use of these coloring agents, the compound can be appropriately selected from among the copper phthalocyanine compounds represented by general formulae (5) and (6), and may be used alone or in combination of two or more thereof.

General formula (5)

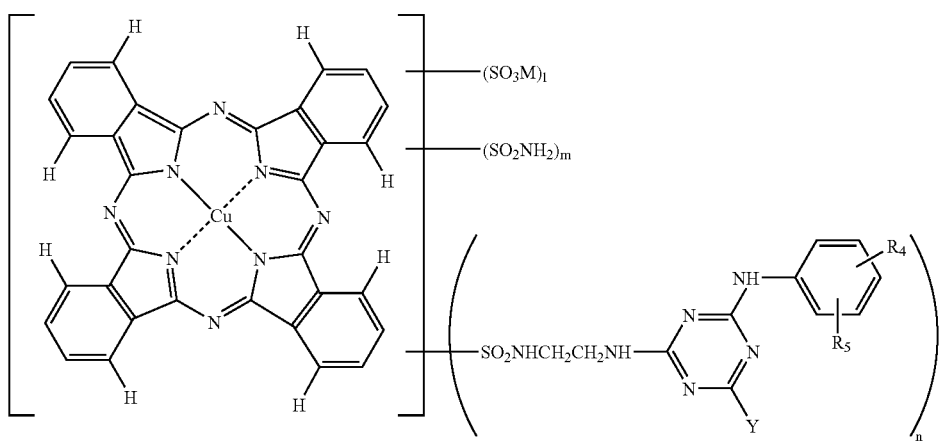

(wherein, $R_4$ and $R_5$ independently represent any of a hydrogen atom, —$SO_3M$ and —COOM (however, $R_4$ and $R_5$ cannot both simultaneously be a hydrogen atom); Y represents a chlorine atom, a hydroxyl group, an amino group, or a mono- or dialkylamino group; the substituted position of the substituent in the phthalocyanine ring is the β position; M represents a counter ion; and l denotes 0 to 2, m denotes 1 to 3, n denotes 1 to 3, and l+m+n=3 or 4)

General formula (6)

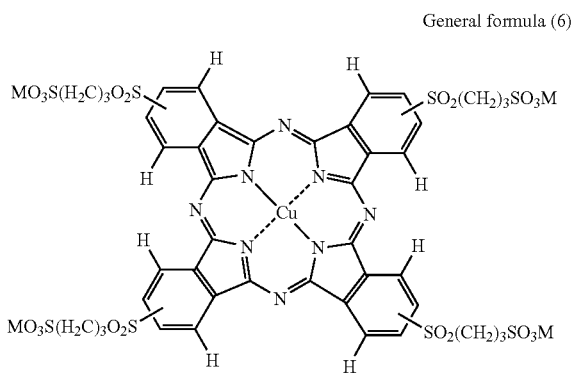

(wherein, the substituted position of the substituent in the phthalocyanine ring is the β position; and M represents a counter ion)

In the copper phthalocyanine compound represented by general formula (5), a compound (7) having the following structure is most preferred in view of the balance between its color developability and weatherability.

Compound (8)

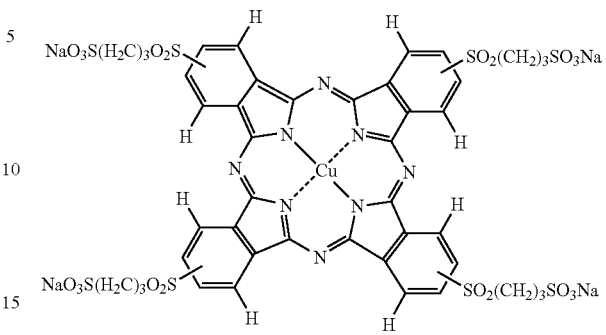

(wherein the substituted position of the substituent is the β position.)

(Inkjet Recording Method and Apparatus)

Next, a recording apparatus which can suitably use the ink according to the present invention will be described. A recording apparatus that can suitably record using the ink according to the present invention typically applies thermal or mechanical energy corresponding to a recording signal to ink in the chamber of a recording head that has an ink storing portion for storing ink, whereby ink droplets are generated from the applied energy.

Figure 3:
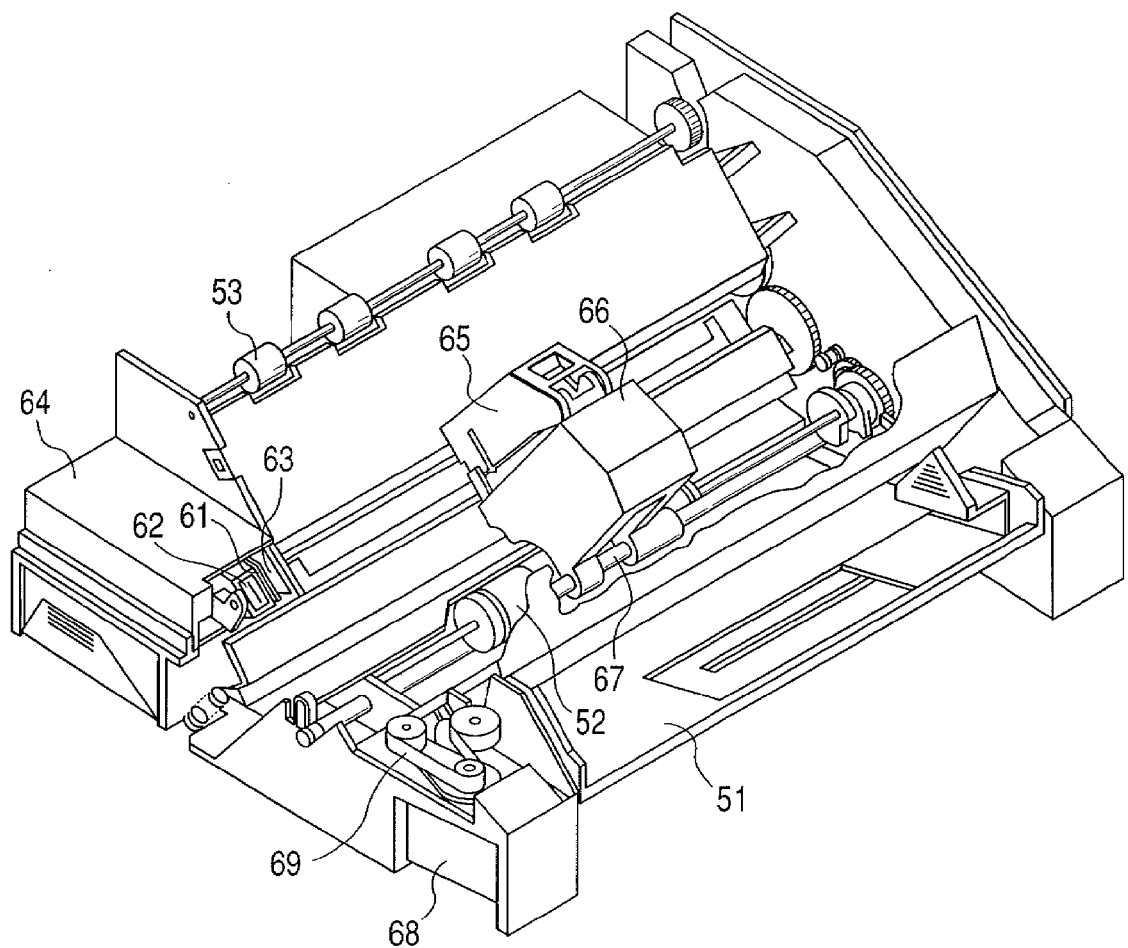
FIG. 3 is a perspective view illustrating one example of an inkjet recording apparatus.

FIG. 3 illustrates one example of an inkjet recording apparatus on which this head is mounted. As shown in FIG. 3, a blade 61 acts as a wiping member. One end of the blade is held Compound (7)

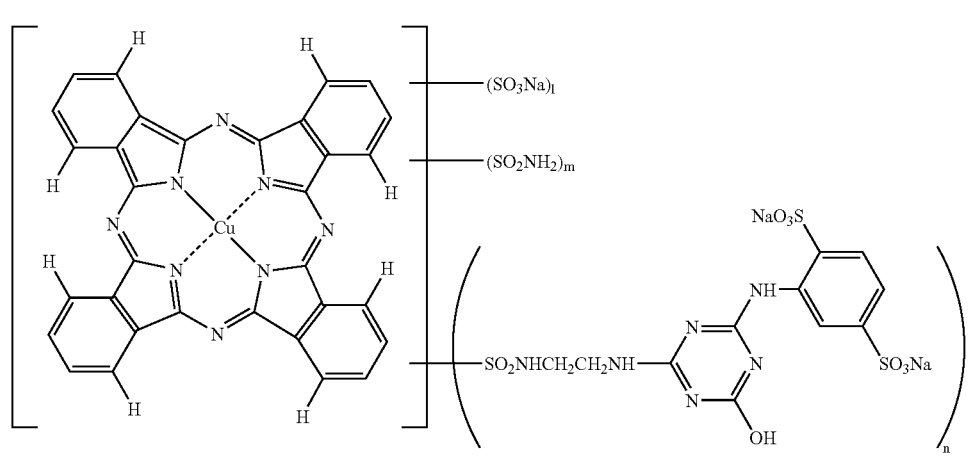

(wherein, l denotes 0 to 2, m denotes 1 to 3, n denotes 1 to 3, and l+m+n=3 or 4; and the substituted position of the substituent is the A position.)

While a specific example of the compound represented by general formula (6) will now be illustrated, the copper phthalocyanine compound used in the present invention is not limited to this example.

by a blade-holding member to form a fixed end, so that the blade has a cantilevered form. The blade 61 is arranged in a position adjacent to a recording region to be recorded by a recording head. In the example illustrated in FIG. 3, the blade 61 held in a manner such that it projects into the movement path of the recording head. A cap 62 is arranged at a home position adjacent to the blade 61. The cap 62 has a configuration such that it moves in a direction perpendicular to the movement direction of the recording head. The cap 62 also abuts with an ink ejection orifice face to thereby cap it. Furthermore, as shown in FIG. 3, an ink absorber 63 is arranged adjacently to the blade 61 and held in manner such that it projects into the movement path of the recording head, similar to the blade 61.

An ejection recovery part 64 includes the above described blade 61, cap 62 and ink absorber 63. The blade 61 and the ink absorber 63 remove moisture and dust from around the ejection orifice face. A recording head 65 that has an eject energy production unit, which ejects ink to a recording medium facing the ejection orifice face provided with an ejection orifice. A carriage 66 mounts the recording head 65 thereon and moves the recording head 65. The carriage 66 is slidably engaged with a guide shaft 67, and one part of the carriage 66 is connected with a belt 69 that is driven by a motor 68. Thereby, the carriage 66 can move along the guide shaft 67, and can move the recording head 65 to the recording region and region adjacent thereto.

A paper feeding part 51 inserts a recording medium, and a paper feeding roller 52 is driven by an unshown motor. The above configuration feeds a recording medium to a position facing the ejection orifice face of the recording head, and delivers the paper to a delivery part provided with a delivery roller 53 as recording progresses.

In the above described configuration, when the recording head 65 returns to the home position after having finished recording, the cap 62 of the ejection recovery part 64 withdraws from the movement path of the recording head 65. However, the blade 61 still projects into the movement path, whereby the ejection orifice face of the recording head 65 is wiped. Moreover, when the cap 62 abuts the eject surface of the recording head 65 to cap it, the cap 62 moves so as to project into the movement path of the recording head.

When the recording head 65 moves from the home position to a recording start position, the cap 62 and the blade 61 stay in the same position as in the above described wiping. As a result, the ejection orifice face of the recording head 65 is wiped also when the recording head 65 moves in the above way. The recording head moves to the home position not only when having finished recording and during eject recovery as described above, but also moves to the home position adjacent to the recording region at a predetermined interval while the recording head is moving over the recording region for the purpose of recording, and is wiped along with the movement.

Figure 4:
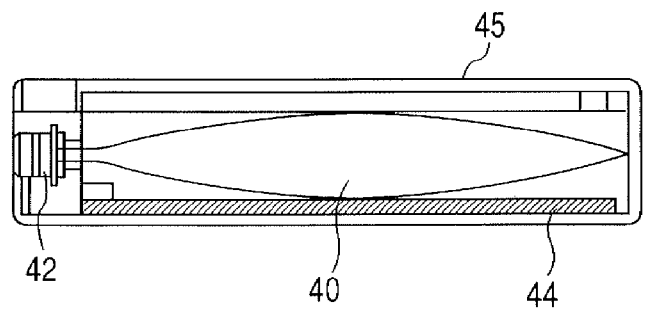
FIG. 4 is a longitudinal sectional view of an ink cartridge.

FIG. 4 is a sectional view illustrating one example of an ink cartridge 45 in which ink supplied to a head through an ink feeding member, for instance, a tube, is stored. As shown in FIG. 4, an ink storing portion 40, for instance, an ink bag, stores the ink to be supplied, a stopper 42 made of rubber is installed at the nose of the ink storing portion. In the stopper 42, a needle (not shown) is inserted to enable the ink in the ink bag 40 to be supplied to the head. An ink absorber 44 contains wasted ink.

Figure 5:
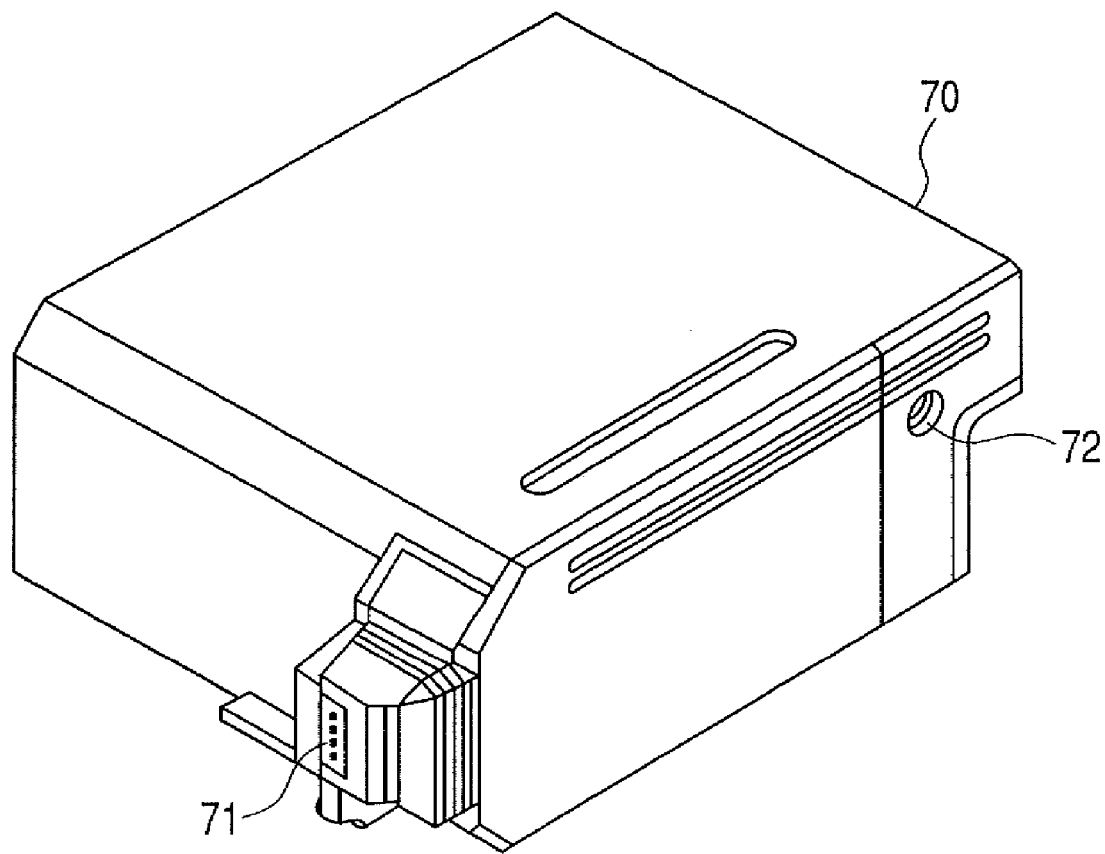
FIG. 5 is a perspective view of a recording unit.

The ink jet recording apparatus used in the present invention is not limited to the above-described apparatus, wherein the head is separated from the ink cartridge. The apparatus illustrated in FIG. 5 in which these parts are integrated may also be suitably used. As shown in FIG. 5, a recording unit 70 contains an ink storing portion, for example, an ink absorber, which stores ink. The recording unit also contains a head 71 having a plurality of orifices for ejecting the ink stored in the ink absorber in the form of ink drops. An air-communicating opening 72 communicates the inside of the recording unit with the air. The recording unit 70 is used in place of the recording head 65 illustrated in FIG. 3, and is removable from the carriage 66.

Figure 6:
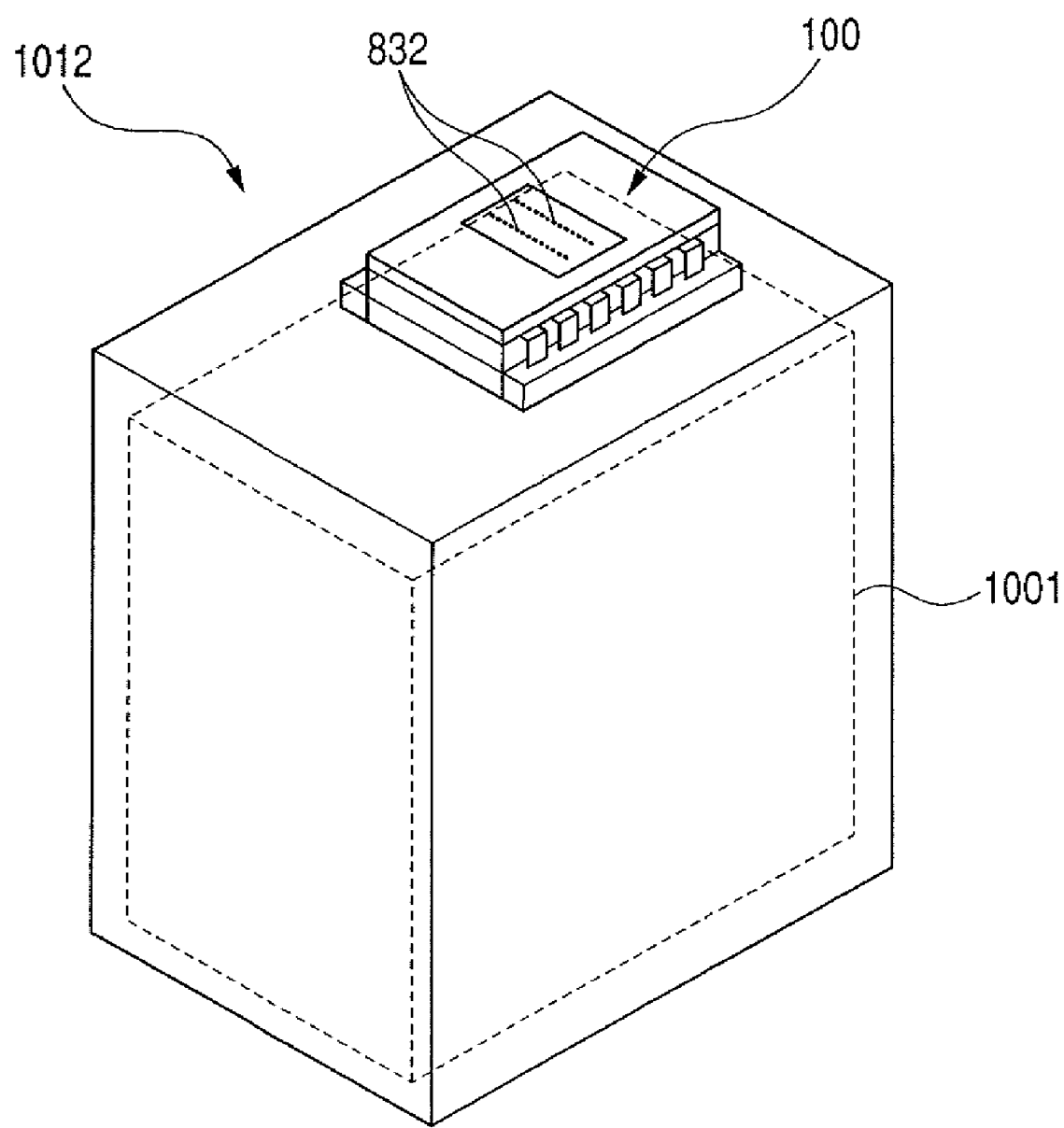
FIG. 6 is a schematic perspective view illustrating one example of an ink cartridge equipped with a liquid ejection head.

FIG. 6 illustrates one example of an ink cartridge which can be mounted onto the above-described inkjet recording apparatus. The carriage 1012 in this embodiment is of a serial type and includes an inkjet recording head 100 and a liquid tank 1001 for storing ink or other such liquid, as principal components thereof. The inkjet recording head 100 is provided with a large number of ejection orifices 832 for ejecting liquid. Thus, the ink or other such liquid is led from the liquid tank 1001 to a common liquid chamber in the liquid ejection head 100 by way of a liquid supply path (not shown). The carriage 1012 illustrated in FIG. 6 is realized by integrally forming the inkjet recording head 100 and liquid tank 1001 so that liquid can be resupplied to the liquid tank 1001 whenever necessary. However, alternatively, the liquid tank 1001 may be replaceably linked to the liquid ejection head 100.

EXAMPLES

The present invention will now be described in more detail with reference to Examples and Comparative Examples. However, the present invention is in no way restricted to these examples. Unless otherwise stated, "parts" and "%" in the description are defined in terms of mass.

Example 1

A dye represented by general formula (1) was obtained in the following manner.

Synthesis Example 1

A compound (9) represented by the following formula was synthesized as the dye represented by general formula (1), wherein the $X_1$ and $X_3$ of formula (1) were hydrogen atoms, $X_2$ was —$SO_3M$, $R_1$ was a hydrogen atom, $R_2$ was —$C(CH_3)_3$, $R_3$ was —$CH_3$, and M was sodium.

Compound (9)

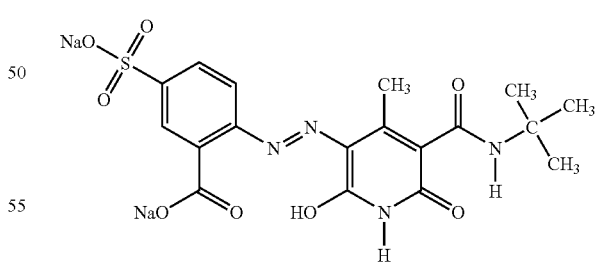

First, a coupler to be reacted with a diazo component was obtained in the following manner. 10.0 g of 2,6-dihydroxy-4-methyl-3-pyridinecarbonitrile (the compound of general formula (3)) was used as the nitrile compound, and 12.4 g of tert-butanol was used as the alcohol to be reacted with this. 50 mL of glacial acetic acid was used as the reaction solvent, and 20 mL of concentrated sulfuric acid was used as the acid catalyst. These materials were, while cooling with ice and stirring, reacted at 0° C. for 3 hours. The temperature of the reacted solution was slowly returned to room temperature and reaction was continued while stirring for 24 hours. Then, the resultant reaction solution was poured into 1,800 mL of water, and the formed precipitation was filtered off. The obtained precipitation was washed with water, then subjected to heated vacuum drying to thereby obtain a coupler (10.5 g, purity of 96.3 area %).

A coupler solution was obtained by dissolving 9.9 g of the thus-obtained coupler in 22.7 g of sodium carbonate and 100 mL of water, and then stirring the resultant mixture at a temperature of 0° C. or less. Then, 10.0 g of 5-sulfoanthranilic acid, 11.2 mL of concentrated hydrochloric acid and 100 mL of water were, while cooling with ice, stirred at a temperature of 0° C. or less. The resultant mixture was charged with 10 mL of a solution in which 3.3 g of sodium nitrite had been dissolved in 10 mL of water, and this solution was stirred for 1 hour. Then, the solution was charged with 0.6 g of sulfamic acid to dissolve any excess nitrous acid. The thus-obtained solution was dropped for 30 minutes in the above-prepared coupler solution. After stirring the resultant solution for 2 hours, the temperature of the solution was slowly returned to room temperature. The pH was made to be less than 1 using concentrated hydrochloric acid and then the solution was stirred for another 2 hours to precipitate with acid. The formed precipitation was filtered, and the obtained filtered matter was neutralized with aqueous sodium carbonate. The resultant product was desalted by electrodialysis. This resultant product was then recrystallized using a mixed solvent of ethanol and water to obtain a dye having the structure represented by the above-described compound (9). The thus-obtained dye was verified to have the above-described structure by NMR spectrometry, mass spectrometry, HPLC analysis, and UV/Vis spectrometry. These results are shown below.

(Analysis Results of Compound (9))

(1) $^1$H NMR(400 MHz, DMSO-$d_6$, room temperature) results (FIG. 1): δ(ppm)=1.34 (s, 9H), 2.19 (s, 3H), 7.65 (dd, 1H), 7.73 (d, 1H), 7.95 (s,1H), 8.32 (d, 1H), 11.36 (s, 1H)

(2) $^{13}$C NMR (100 MHz, DMSO-$d_6$, Room Temperature) Results:

δ(ppm)=14.3, 28.5, 50.6, 113.5, 124.2, 126.0, 128.2, 129.4, 143.1, 143.2, 145.7, 159.8, 162.4, 164.2, 169.4

(3) Mass Spectrometry (ESI-TOF) Results:

m/z=473.08 (M-Na)$^-$, 451.10 (M-2Na+H)$^-$, 225.05 (M-2Na)$^2$ (4) HPLC Results Purity=98.8 area %, 12.0 minute retention time (0.1 mM TEA solution-MeOH)

(5) UV/Vis spectrometry results $\lambda_{max}$=429 nm, ε=42,304 M$^{-1}$ cm$^{-1}$ (solvent: H$_2$O, at room temperature)

Synthesis Example 2

A compound (10) represented by the following formula was synthesized as the dye represented by general formula (1), wherein the $X_1$ and $X_3$ of formula (1) were hydrogen atoms, $X_2$ was —SO$_3$M, $R_1$ was a hydrogen atom, $R_3$ was —CH$_3$, $R_2$ was —C(CH$_3$) C$_6$H$_4$SO$_3$M, and M was sodium.

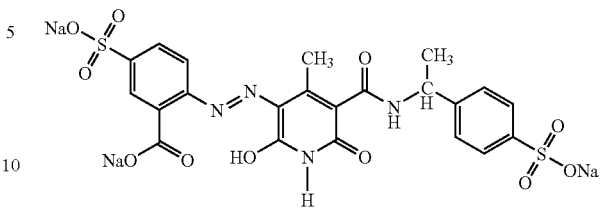

Compound (10)

First, a coupler to be reacted with a diazo component was obtained in the following manner. 10.0 g of 2,6-dihydroxy-4-methyl-3-pyridinecarbonitrile (the compound of general formula (3)) was used as the nitrite compound, and 41.2 g of 80% sodium p-styrenesulfonate was used as the alkene to be reacted with this. 50 mL of glacial acetic acid was used as the reaction solvent, and 30 mL of concentrated sulfuric acid was used as the acid catalyst. The nitrite compound and the alkene were charged into the reaction solvent and acid catalyst under stirring and while maintaining the temperature at 10° C. or less over 1 hour. The temperature of the resultant solution was subsequently increased to between 45 and 50° C., and the solution made to react at this temperature for 30 hours. The solution was then cooled and dropped into 250 g of ice water. The solution was stirred for 5 hours at a temperature between 5 to 10° C., and then dropped under stirring into aqueous potassium chloride at 10° C. or less so as to be an amount equivalent to the concentrated sulfuric acid used above. The precipitated calcium sulfate was filtered off. Subsequently, the filtrate was neutralized using sodium carbonate to have a pH of 6.5, and the resultant solution was taken as the coupler solution.

14.5 g of 5-sulfoanthranilic acid, 150 g of water and 14 mL of concentrated hydrochloric acid were mixed together. The resultant solution was charged under stirring with 15 mL of 32% aqueous sodium nitrite at between 0 and 5° C., and this solution was stirred for a further 1 hour to carry out diazotization. Excess nitrous acid was broken up with sulfamic acid. This diazo solution was charged for 30 minutes with the above-prepared coupler solution cooled to 10° C. After stirring the resultant solution for 2 hours, the temperature of the solution was increased to room temperature. The pH of the solution was adjusted to less than 1 using hydrochloric acid and then the solution was stirred for another 2 hours to precipitate with acid. The formed precipitation was filtered off, and the obtained filtered matter was neutralized with aqueous sodium carbonate. The resultant product was then desalted by electrodialysis. This resultant product was then recrystallized using a mixed solvent of ethanol and water to obtain 22.5 g of a dye having the structure represented by the above-described compound (10). The thus-obtained dye was verified to have the structure of compound (10) by NMR spectrometry, mass spectrometry, HPLC analysis, and UV/Vis spectrometry carried out using the above-described instruments and under the above-described conditions. These results are shown below.

(Analysis Results of Compound (10))

(1) $^1$H NMR (400 MHz, DMSO-d$_6$, Room Temperature) Results:

δ(ppm)=1.39 (d, 3H), 2.15 (s, 3H), 5.04 (qui, 1H), 7.38 (d, 2H), 7.58 (d, 2H), 7.40 (dd, 1H), 7.75 (d, 1H), 8.32 (d, 1H), 8.80 (d, 1H), 11.41 (s, 1H)

(2) $^{13}$C NMR (100 MHz, D$_2$O, Room Temperature) Results:

δ(ppm)=14.58, 22.60, 48.08, 113.65, 124.03, 124.28, 124.94, 125.45, 125.51, 128.20, 129.42, 143.19, 143.25, 144.96, 146.47, 146.77, 159.69, 162.46, 163.92, 169.42

(3) Mass Spectrometry (ESI-TOF) Results:

m/z=623.00 (M-Na)$^-$, 300.03 (M-2Na)$^{2-}$, 289.03 (M-3Na+H)$^{2-}$, 192.37 (M-3Na)$^3$ (4) HPLC Results:

Purity=97.1 area %, 10.4 minute retention time (0.1 mM TFA solution-MeOH)

(5) UV/Vis Spectrometry Results $\lambda_{max}$=429 nm, $\epsilon$=43,813 M$^{-1}$ cm$^{-1}$ (solvent: H$_2$O, at room temperature)

Synthesis Examples 3 to 18

Novel compounds (11) to (26) were obtained using the method described in Synthesis Example 1 with R$_1$ to R$_3$, X$_1$ to X$_3$ and M of general formula (1) as listed in Table 1. The structure of these compounds (11) to (26) was verified in the same manner as for the case of the compound (9), by NMR spectrometry, mass spectrometry, UV/Vis spectrometry and HPLC analysis.

TABLE I-1

Compounds (9) to (17)

| | Compound No. | —R$_1$ | —R$_2$ | —R$_3$ | X$_1$ | —X$_2$ | X$_3$ | M |
|---|---|---|---|---|---|---|---|---|
| Synthesis Example 1 | (9) | —H | —C(CH$_3$)$_3$ | —CH$_3$ | H | —SO$_3$M | H | Na |
| Synthesis Example 2 | (10) | —H | —CH(CH$_3$)–C$_6$H$_4$–SO$_2$–OM (para) | —CH$_3$ | H | —SO$_3$M | H | Na |
| Synthesis Example 3 | (11) | —H | —C(CH$_3$)$_2$–CH$_2$–SO$_2$–OM | —CH$_3$ | H | —SO$_3$M | H | Na |
| Synthesis Example 4 | (12) | —Et | cyclopentyl | —CH$_3$ | H | —SO$_3$M | H | Na |
| Synthesis Example 5 | (13) | —Ph | —C(CH$_3$)$_3$ | —CH$_3$ | H | —SO$_3$M | H | Na |
| Synthesis Example 6 | (14) | —Bn | —C(CH$_3$)$_3$ | —CH$_3$ | H | —SO$_3$M | H | Na |
| Synthesis Example 7 | (15) | —H | cyclopentyl | —CH$_3$ | H | —SO$_3$M | H | Na |
| Synthesis Example 8 | (16) | —H | cyclopentyl-C(=O)OM | —CH$_3$ | H | —SO$_3$M | H | Na |

TABLE I-1-continued

Compounds (9) to (17)

| Compound No. | —R₁ | —R₂ | —R₃ | X₁ | —X₂ | X₃ | M |
|---|---|---|---|---|---|---|---|
| Synthesis Example 9 | (17) —Et | 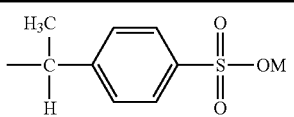 | —CH₃ | H | —H | H | Na |

Et represents an ethyl group, Ph represents a phenyl group and Bn represents a benzyl group.

TABLE 1-2

Compounds (18) to (26)

| Compound No. | R₁ | —R₂ | —R₃ | X₁ | —X₂ | X₃ | M |
|---|---|---|---|---|---|---|---|
| Synthesis Example 10 | (18) H |  | —CH₃ | —H | —SO₃M | H | Na |
| Synthesis Example 11 | (19) H | 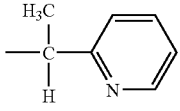 | —CH₃ | —H | —SO₃M | H | Na |
| Synthesis Example 12 | (20) H |  | —Ph | —H | —SO₃M | H | Na |
| Synthesis Example 13 | (21) H | 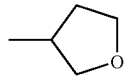 | —Bn | —H | —SO₃M | H | Na |
| Synthesis Example 14 | (22) H | 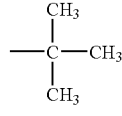 | —CH₃ | —H | —H | H | Na |
| Synthesis Example 15 | (23) H | 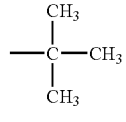 | —CH₃ | —H | —F | H | Na |
| Synthesis Example 16 | (24) H | 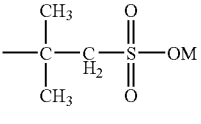 | —CH₃ | —COOM | —H | H | Na |

TABLE 1-2-continued

Compounds (18) to (26)

| | Compound No. | $R_1$ | $-R_2$ | $-R_3$ | $X_1$ | $-X_2$ | $X_3$ | M |
|---|---|---|---|---|---|---|---|---|
| Synthesis Example 17 | (25) | H | $-C(CH_3)_2-CH_3$ with CH$_3$ branches | $-CH_3$ | $-H$ | $-SO_3M$ | H | Li |
| Synthesis Example 18 | (26) | H | $-C(CH_3)_2-CH_3$ with CH$_3$ branches | $-CH_3$ | $-H$ | $-SO_3M$ | H | $NH_4$ |

Et represents an ethyl group, Ph represents a phenyl group and Bn represents a benzyl group.

Example 2

A yellow ink solution was prepared using the dye prepared in Example 1, and evaluated.

| (Preparation of ink solution A) | |
|---|---|
| Compound (9) obtained in Synthesis Example 1: | 3.5 parts |
| Ethylene glycol: | 7.5 parts |
| Glycerin: | 7.5 parts |
| Urea: | 7.5 parts |
| Acetylenol EH (manufactured by Kawaken Fine Chemicals Co., Ltd.) | 1 part |
| Water: | 73 parts |

(Preparation of Ink Solutions B to H)

Ink solutions B to H were prepared in the same manner as in the preparation of ink solution A, except that the compound (9) used in the preparation of ink solution A was changed to the respective dyes as listed in Table 1 that had been prepared beforehand.

Comparative Example 1

(Preparation of Ink Solutions 101 and 102)

Ink solutions 101 and 102 were prepared in the same manner as in the preparation of ink solution A, except that the compound (9) used in the preparation of ink solution A of Example 2 was changed to comparative compounds (1) and (2) which had the following structure.

TABLE 2

Yellow ink preparation examples

Comparative compound (1)

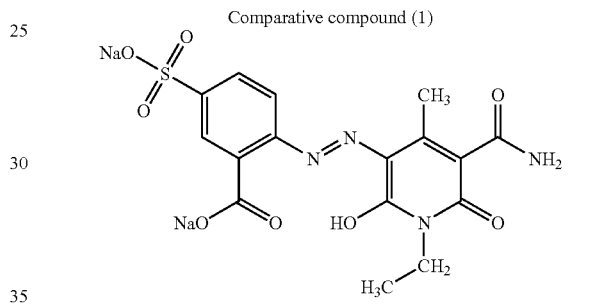

Comparative compound (2)

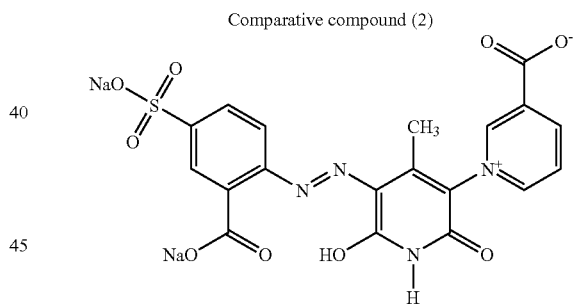

| Ink solution | Compound No. |
|---|---|
| A | (9) |
| B | (10) |
| C | (12) |
| D | (14) |
| F | (17) |
| F | (20) |
| G | (22) |
| H | (24) |
| 101 | Comparative compound (1) |
| 102 | Comparative compound (2) |

(Evaluation)

Each of the thus-prepared yellow ink solutions was filled into an ink cartridge of a bubble jet® printer PIXUS 950i manufactured by Canon Inc. Evaluation was conducted according to the following methods using images formed in the manner described below. Solid images having sides of 2 cm by 2 cm were printed using this inkjet printer at 5% duty to 100% duty in intervals of 5% on photographic glossy paper professional photo paper PR101 (made by Canon Inc.). The obtained recorded objects were allowed to dry naturally for 24 hours.

(Chroma Saturation)

Optical density and chromaticity ($L^*$, $a^*$, $b^*$) for each of the images on the photographic glossy paper obtained by the above-described methods in the CIE $L^*a^*b^*$ calorimetric system were measured using the reflection densitometer Spectrolino (manufactured by Gretag Macbeth). Chroma Saturation was calculated by the following formula based on the measured values of the color characteristics.

Chroma Saturation $(c^*) = \sqrt{\{(a^*)^2 + (b^*)^2\}}$

Evaluation was conducted using the above value according to the following criteria. The obtained evaluation results are shown in Table 3. The value of $c^*$ when $L^* = 92$ was:

AA: $c^* \geq 110$

A: $110 > c^* \geq 90$

B: $c^* < 90$

If $c^*$ was 90 or greater, it was determined that a recorded matter with good quality could be obtained.

(Light Resistance)

An obtained image having 100% duty was charged into a xenon tester ("XL-750", manufactured by Suga Test Instruments Co., Ltd.), and then exposed for 168 hours at a temperature of 24° C. and 60% humidity in a 100 klx atmosphere. The reflection density of the recorded matter was measured before and after this exposure. The yellow density residual ratio $((Y_f/Y_0) \times 100(\%))$ was calculated from the initial yellow image density $Y_0$ and the post-exposure yellow image density $Y_f$. The evaluation criteria are as follows. The obtained evaluation results are shown in Table 3.

AA: Yellow density residual ratio of 80% or more

A: Yellow density residual ratio of 70% or more and less than 80%

B: Yellow density residual ratio of less than 70%

(Ozone Resistance)

An obtained image having 100% duty was exposed for 4 hours to an atmosphere having an ozone concentration of 10 ppm, temperature of 24° C. and relative humidity of 60% using an ozone weather meter ("OMS-H", manufactured by Suga Test Instruments Co., Ltd.). The reflection density of the recorded matter was measured before and after this exposure. The obtained results were evaluated by the same criteria as for light resistance. The obtained evaluation results are shown in Table 3.

(Humidity Resistance)

An obtained image having 100% duty was stored for 1 week in an atmosphere of 30° C. and relative humidity of 80%, and then visually evaluated for feathering of the edges and color tone variation. The evaluation criteria are as follows. The obtained evaluation results are shown in Table 3.

AA: No feathering at the edges, and no color tone variation

A: No feathering at the edges, but a slight amount of color tone variation

B: Feathering at the edges

Table 3: Yellow ink evaluation results

TABLE 3

| | | Yellow ink evaluation results | | | |
|---|---|---|---|---|---|
| Ink solution | Compound No. | Chroma Saturation | Light resistance | Ozone resistance | Humidity resistance |
| A | (9) | AA | AA | AA | AA |
| B | (10) | AA | AA | AA | AA |
| C | (12) | AA | A | A | AA |
| D | (14) | AA | A | A | AA |
| E | (17) | A | A | A | A |
| F | (20) | AA | AA | A | AA |
| G | (22) | A | AA | AA | A |
| H | (24) | AA | AA | AA | AA |
| 101 | Comparative coumpound (1) | AA | AA | B | B |
| 102 | Comparative compound (2) | B | AA | AA | A |

AA: No feathering at the edges, and no color tone variation
A: No feathering at the edges, but a slight amount of color tone variation
B: Feathering at the edges From Table 3, it can be seen that, when used in image formation, the ink using the dye according to the present invention can provide a high-saturation image, and yet such an image has high weatherfastness with good light resistance, ozone resistance and humidity resistance. As a result of this, it was verified that the ink using the dye according to the present invention was very effective as a dye for yellow ink. It was verified that especially images formed from the ink using the dye represented by general formula (2) had particularly good light resistance, ozone resistance and humidity resistance.

Example 3

Comparative Example 2

A green ink solution I having the following composition was prepared using the compound (9) obtained in Example 1 and a cyan dye (phthalocyanine compound) represented as the above compound (8).

| (Preparation of green ink solution I) | |
|---|---|
| Compound (9) obtained in Synthesis Example 1: | 3.0 parts |
| Cyan dye represented by compound (8): | 0.6 parts |
| Ethylene glycol: | 7.5 parts |
| Glycerin: | 7.5 parts |
| Urea: | 7.5 parts |
| Acetylenol EH (manufactured by Kawaken Fine Chemicals Co., Ltd.) | 1 part |
| Water: | 72.9 parts |

(Preparation of Green Ink Solutions J to M, 103 and 104)

Ink solutions J to M, 103 and 104 were prepared in the same manner as in the preparation of green ink solution I, except that the dye was respectively changed as listed in Table 4.

TABLE 4

Green ink preparation examples

| Ink solution | Compound No. Dye 1 | Dye 2 | Dye 1 (parts) | Dye 2 (parts) |
|---|---|---|---|---|
| I | (10) | (8) | 3.0 | 0.6 |
| J | (11) | (8) | 3.0 | 0.6 |
| K | (10) | (7) | 3.0 | 0.6 |
| L | (12) | (8) | 3.0 | 0.6 |
| M | (22) | (8) | 3.0 | 0.6 |
| 103 | Comparative compound (1) | (8) | 3.0 | 0.6 |
| 104 | Comparative compound (2) | (8) | 3.0 | 0.6 |

(Evaluation)

Each of the thus-prepared green ink solutions was filled into an ink cartridge of a bubble jet® printer PIXUS 950i. Evaluation was conducted according to the following methods using images formed in the manner described below. Solid images having sides of 2 cm by 2 cm were printed using this inkjet printer at 5% duty to 100% duty in intervals of 5% on photographic glossy professional photo paper PR101 (made by Canon Inc.). The obtained recorded objects were allowed to dry naturally for 24 hours and then used as recorded matters for evaluation.

(Image Quality Evaluation)

The thus-obtained images were visually observed and evaluated according to the following criteria. The obtained evaluation results are shown in Table 5.

AA: Image obtained wherein color development of the green portion was bright and vivid, and which had smooth gradation A: Color development of the green portion was bright and vivid, but intermediate tone vividness was insufficient B: Vividness in the color development of the green portion could not be seen (Light Resistance)

An obtained image having 100% duty was charged into a xenon tester ("XL-750", manufactured by Suga Test Instruments Co., Ltd.), and then exposed for 168 hours at a temperature of 24° C. and 60% humidity in a 100 klx atmosphere. The CIE L*a*b* of the recorded matters before and after exposure were measured using a Spectrolino. ΔE was calculated and determined using the following formula, with the pretesting sample taken as $(L_0, a_0, b_0)$ and the post-testing sample as $(L_1, a_1, b_1)$: $\Delta E = \sqrt{((L_1-L_0)^2+(a_1-a_0)^2+(b_1-b_0)^2)}$ The evaluation criteria are as follows. The obtained evaluation results are shown in Table 5.

AA: ΔE of less than 15

A: ΔE of 15 or more to less than 20

B: ΔE of 20 or more (Ozone Resistance)

An obtained image having 100% duty was exposed for 4 hours to an atmosphere having an ozone concentration of 10 ppm, temperature of 24° C. and relative humidity of 60% using an ozone weather meter ("OMS-H", manufactured by Suga Test Instruments Co., Ltd.). The ΔE of the recorded matter was measured and evaluated. The obtained results were evaluated by the same criteria as for light resistance. The obtained results are shown in Table 5.

(Humidity Resistance)

An obtained image having 100% duty was stored for 1 week in an atmosphere of 30° C. and relative humidity of 80%, and then visually evaluated for feathering of the edges and color tone variation. The evaluation criteria are as follows. The obtained evaluation results are shown in Table 5.

TABLE 5

Green ink evaluation results

| Ink solution | Image quality evaluation | Light resistance | Ozone resistance | Humidity resistance |
|---|---|---|---|---|
| I | AA | AA | AA | AA |
| J | AA | AA | AA | AA |
| K | AA | AA | AA | AA |
| L | AA | A | A | AA |
| M | A | AA | AA | A |
| 103 | AA | AA | B | B |
| 104 | B | AA | AA | A |

AA: No feathering at the edges, and no color tone variation
A: No feathering at the edges, but a slight amount of color tone variation
B: Feathering at the edges From Table 5, it can be seen that the images formed from green inks I to M which used the dye according to the present invention have good light resistance, ozone resistance and humidity resistance. As a result of this, it was verified that these inks were effective as a dye for green ink. It was especially verified that, when used in image formation as an ink, the dye represented by general formula (2) could provide an image having particularly good light resistance, ozone resistance and humidity resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-140423, filed May 19, 2006, which is hereby incorporated by reference herein in its entirety.

What is claimed is:

1. A dye represented by the following general formula (1),

General formula (1)

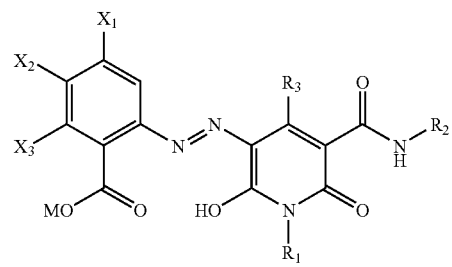

wherein $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion.

2. The dye according to claim 1 represented by the following general formula (2),

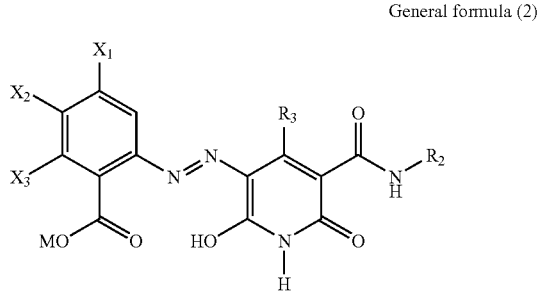

General formula (2)

wherein $R_2$ represents an alkyl group that may be substituted, a cycloalkyl group that may be substituted or an aralkyl group that may be substituted; $X_1$ through $X_3$ independently represent a hydrogen atom or any substituent; and M represents a counter ion.

3. The dye according to claim 1, wherein at least one of $X_1$ through $X_3$ in general formula (1) is an ionic group.

4. The dye according to claim 2, wherein at least one of $X_1$ through $X_3$ in general formula (2) is an ionic group.

5. A method of producing an azo dye comprising: reacting a nitrile compound represented by the following general formula (3) with an alcohol or an alkene in the presence of an acid catalyst; and then coupling the obtained reaction product with a diazo component of an aniline derivative represented by the following general formula (4),

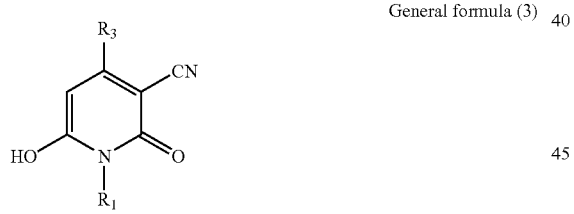

General formula (3)

wherein $R_1$ represents a hydrogen atom, an alkyl group that may be substituted, an aryl group that may be substituted or an aralkyl group that may be substituted; and $R_3$ represents an alkyl group that may be substituted, an aryl group that may be substituted or an aralkyl group that may be substituted,

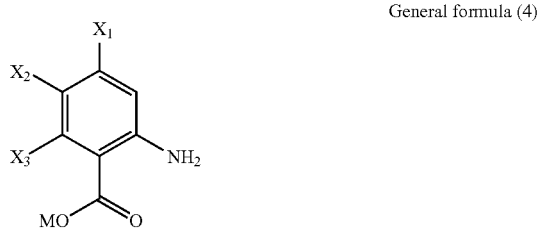

General formula (4)

wherein $X_1$ through $X_3$ independently represent a hydrogen atom or any substituent.

6. The method of producing an azo dye according to claim 5, wherein the azo dye obtained after coupling is a dye represented by the following general formula (1),

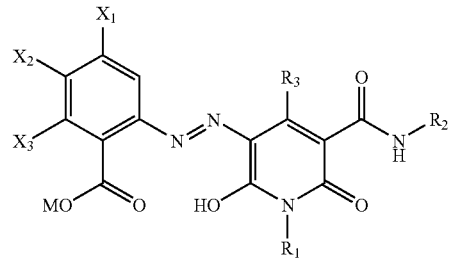

General formula (1)

wherein $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion.

7. An ink at least comprising an aqueous medium and a dye, wherein the dye is represented by the following general formula (1),

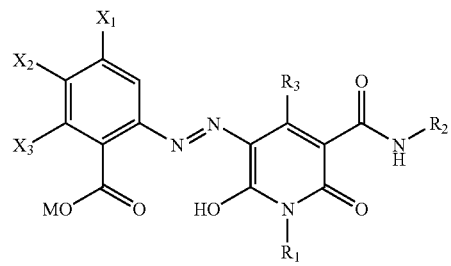

General formula (1)

wherein $R_1$ represents a hydrogen atom, an alkyl group that may be substituted, an aryl group that may be substituted or an aralkyl group that may be substituted; $R_2$ represents an alkyl group that may be substituted, a cycloalkyl group that may be substituted or an aralkyl group that may be substituted; $R_3$ represents an alkyl group that may be substituted, an aryl group that may be substituted or an aralkyl group that may be substituted; $X_1$ through $X_3$ independently represent a hydrogen atom or any substituent; and M represents a counter ion.

8. The ink according to claim 7, which is used for inkjet recording.

9. The ink according to claim 7, further comprising a copper phthalocyanine compound as the dye.

10. The ink according to claim 9, wherein the copper phthalocyanine compound is represented by general formula (5) or (6), General formula (5)

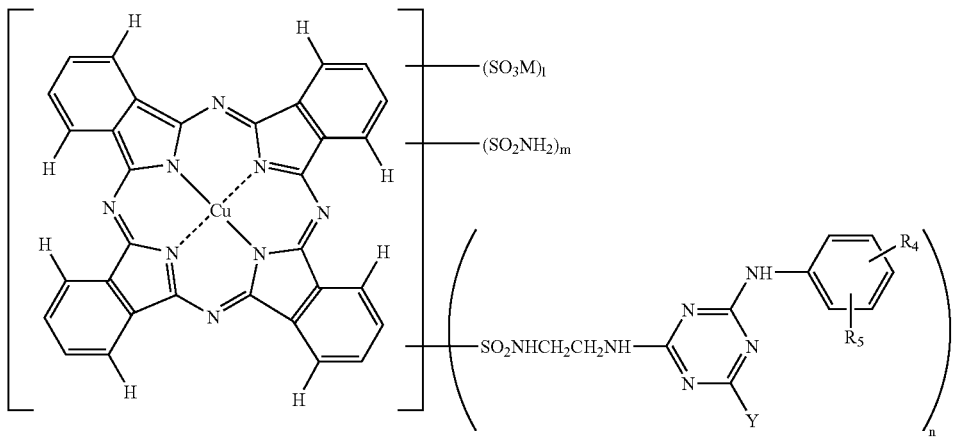

wherein, $R_4$ and $R_5$ independently represent any of a hydrogen atom, —$SO_3M$ and —$COOM$ (provided that $R_4$ and $R_5$ cannot simultaneously be a hydrogen atom); Y represents a chlorine atom, a hydroxyl group, an amino group, or a mono- or dialkylamino group; the substituted position of the substituent in the phthalocyanine ring is the β position; M represents a counter ion; and l denotes 0 to 2, m denotes 1 to 3, n denotes 1 to 3, and l+m+n=3 or 4, General formula (6)

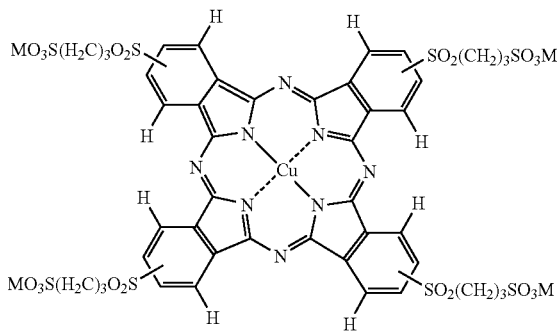

wherein, the substituted position of the substituent in the phthalocyanine ring is the β position; and M represents a counter ion.

* * * * *